US012251639B2

(12) United States Patent
Larson

(10) Patent No.: US 12,251,639 B2
(45) **Date of Patent: *Mar. 18, 2025**

(54) ELECTRIFIED GAME PIECE MANIPULATION GAME AND GAME PIECE MANIPULATOR

(71) Applicant: Jeffrey Scott Larson, Sugar City, ID (US)

(72) Inventor: Jeffrey Scott Larson, Sugar City, ID (US)

( * ) Notice: Subject to any disclaimer, the term of this patent is extended or adjusted under 35 U.S.C. 154(b) by 323 days.

This patent is subject to a terminal disclaimer.

(21) Appl. No.: 17/808,875

(22) Filed: Jun. 24, 2022

(65) Prior Publication Data

US 2022/0314108 A1 Oct. 6, 2022

Related U.S. Application Data

(63) Continuation-in-part of application No. 17/334,299, filed on May 28, 2021, now Pat. No. 11,400,361.

(60) Provisional application No. 62/704,839, filed on May 30, 2020.

(51) Int. Cl.

| | |
|---|---|
| ***A63F 9/00*** | (2006.01) |
| ***A63F 9/24*** | (2006.01) |
| ***A63F 11/00*** | (2006.01) |
| ***F21V 23/00*** | (2015.01) |

(52) U.S. Cl.

CPC .............. *A63F 9/0073* (2013.01); *A63F 9/24* (2013.01); *A63F 11/0025* (2013.01); *F21V 23/003* (2013.01); *A63F 2009/2454* (2013.01); *A63F 2009/247* (2013.01); *A63F 2009/2494* (2013.01)

(58) Field of Classification Search

CPC ...... A63F 9/0073; A63F 9/24; A63F 11/0025; A63F 2009/2454; A63F 2009/247; A63F 2009/2494; A63F 2009/2452; A63F 2009/2479; A63F 2011/0044; A63F 2250/025; A63F 2250/265; A63F 9/26; A63F 9/30; F21V 23/003

USPC ............................................ 273/249; 463/25

See application file for complete search history.

(56) References Cited

U.S. PATENT DOCUMENTS

| | | | | |
|---|---|---|---|---|
| 10,525,333 | B2 * | 1/2020 | Anderson | A61B 5/1113 |
| 11,400,361 | B2 | 8/2022 | Larsen | |
| 2012/0050198 | A1 * | 3/2012 | Cannon | G06F 3/0488 345/173 |
| 2014/0197052 | A1 * | 7/2014 | Block | A63F 9/001 427/97.3 |
| 2016/0089599 | A1 * | 3/2016 | Anderson | A61B 5/1113 463/40 |
| 2019/0009170 | A1 * | 1/2019 | Anderson | H04W 52/0254 |
| 2021/0370162 | A1 | 12/2021 | Larson | |

* cited by examiner

*Primary Examiner* — Pierre E Elisca

(74) *Attorney, Agent, or Firm* — Schmeiser, Olsen & Watts LLP

(57) ABSTRACT

A game system according to various embodiments of the subject disclosure may include a game piece and a game piece manipulator configured to hold the game piece. The game piece manipulator may include a first surface comprising a first electrically conductive portion and a controller configured to control an electric stimulus emitted by the game piece manipulator. The game piece manipulator may emit the electric stimulus by the first electrically conductive portion. The game piece may further include a power supply.

20 Claims, 21 Drawing Sheets

ELECTRIFIED GAME PIECE MANIPULATION GAME AND GAME PIECE MANIPULATOR

CROSS REFERENCE TO RELATED APPLICATIONS

This application is a continuation-in-part of U.S. patent application Ser. No. 17/334,299, filed May 28, 2021, which claims benefit of U.S. provisional patent application 62/704, 839, filed May 30, 2020, the disclosures of which are hereby incorporated entirely herein by reference.

TECHNICAL FIELD

The technical field relates to parlor games of skill and dexterity. Particularly, the technical field relates to a game in which players manipulate game pieces.

BACKGROUND

People enjoy playing games together in which each player's skill and dexterity are tested. These types of games are often played at get-togethers of family or friends in which the players demonstrate their skills to one another to determine the winner. Dexterity games often require players to make precise movements of their hands or bodies in order to manipulate game pieces on top, inside of, or around one another. Dexterity games may also require players to take turns within certain time limits, or to perform their turn without causing a particular result; these limitations create tension and suspense for players and add to the players' excitement. An example of a dexterity game is one in which game pieces must be manipulated in a particular way within a particular amount of time, such as by stacking the pieces, or moving the pieces from one location to another. However, the tension and suspense provided by such games is often limited to aspects such as time limitations or requiring the players to avoid a particular outcome such as destruction of a game piece structure during their turn. After many rounds of play, these aspects may no longer provide a stimulating level of excitement to players. A game piece manipulation game that provides startling electric shocks to players would be well-received in the art.

SUMMARY

A game system according to various embodiments of the subject disclosure may include a game piece and a game piece manipulator configured to hold the game piece. The game piece manipulator may include a first surface comprising a first electrically conductive portion and a controller configured to control an electric stimulus emitted by the game piece manipulator. The game piece manipulator may emit the electric stimulus by the first electrically conductive portion. The game piece may further include a power supply.

DETAILED DESCRIPTION

A detailed description of the hereinafter-described embodiments of the disclosed apparatus and method are presented herein by way of exemplification and not limitation with reference made to the Figures. Although certain embodiments are shown and described in detail, it should be understood that various changes and modifications might be made without departing from the scope of the appended claims. The scope of the present disclosure will in no way be limited to the number of constituting components, the materials thereof, the shapes thereof, colors thereof, the relative arrangement thereof, etc., and are disclosed simply as an example of embodiments of the present disclosure. A more complete understanding of the present embodiments and advantages thereof may be acquired by referring to the following description taken in conjunction with the accompanying drawings, in which like reference numbers indicate like features.

Figure 1:
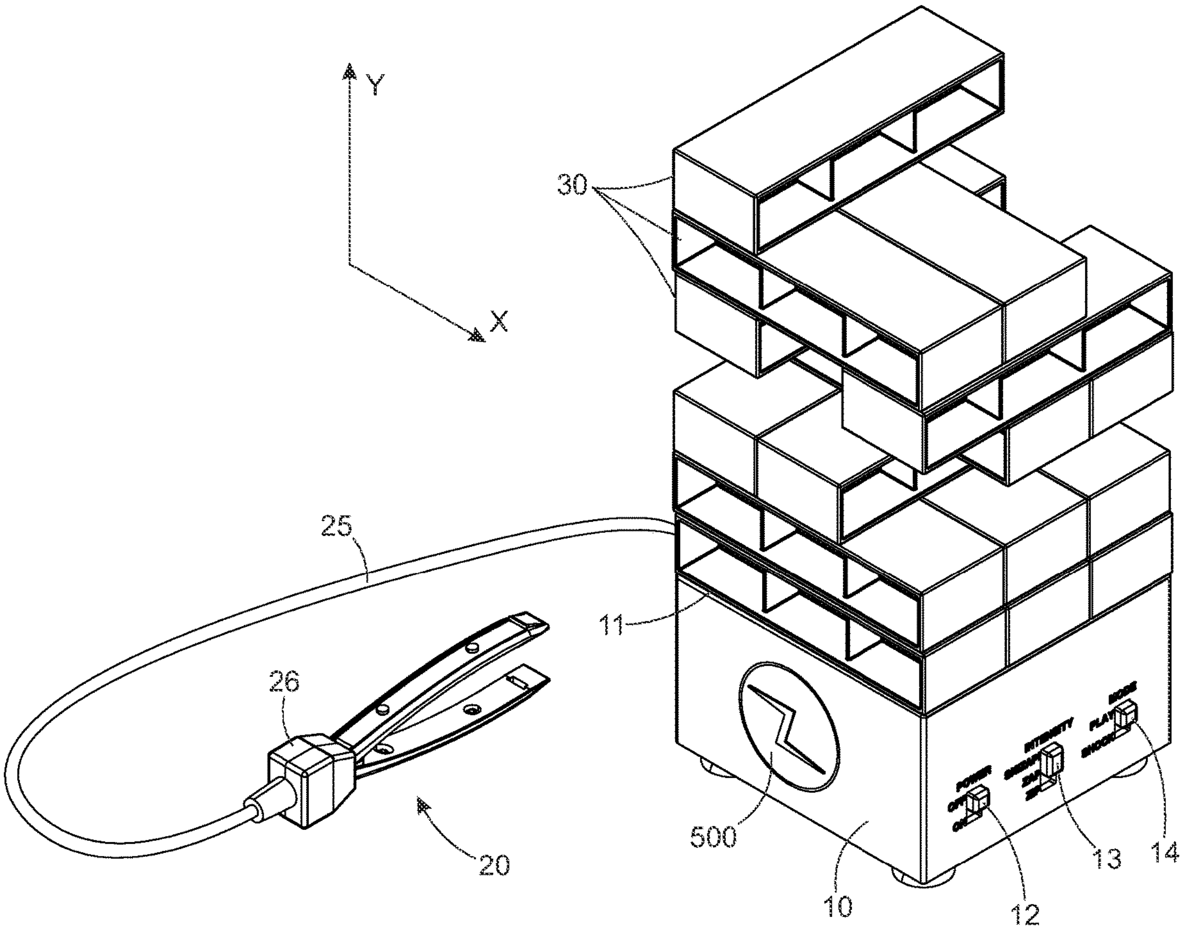
FIG. 1 depicts a perspective view of an electrified game piece manipulation game according to an embodiment.

With reference to FIG. 1, a perspective view of an electrified game piece manipulation game 1 is shown according to an embodiment. In this embodiment, the electrified game piece manipulation game 1 includes a base 10, a game piece manipulator 20, and a plurality of game pieces 30. The base 10 includes a flat top base surface 11 configured to receive the plurality of game pieces 30. For example, the plurality of game pieces 30 may be interchangeably stackable along a horizontal X axis parallel to the flat top base surface 11, and along a vertical Y axis perpendicular to the flat top base surface 11. In another embodiment, the flat top base surface 11 may be configured to receive the plurality of game pieces 30 in one or more recesses in the flat top base surface. One or more recesses in the flat top base surface may be configured to receive differently sized game pieces 30. Recesses may be compartments, holes, bores, indents, dips, slits, and the like. In another embodiment, the base 10 may have a top base surface that is not flat.

With continuing reference to FIG. 1, in this embodiment, the game pieces 30 are rectangular and each have a space 36 containing an internal center wall 37 that extends along the internal length of the game piece, and a plurality of supplemental walls 38, 39 (shown and described hereinafter with reference to FIGS. 9 and 10) that extend along an internal width of the game piece (shown and described hereinafter with reference to FIGS. 9 and 10). The electrified game piece manipulation game 1 is not limited to being played with the quantity of game pieces 30 shown in the Figures, and may include and be played with any number of game pieces 30.

With continuing reference to FIG. 1, the base 10 includes a controller 200 (shown and described hereinafter with respect to FIG. 15 which is configured to control, such as by sending control signals, the game piece manipulator 20, for example, during game play. The game piece manipulator 20 includes a tweezer and a surface 27. In other embodiments, the game piece manipulator 20 may include tongs, a clamp, pair of pincers, forceps, and the like. The game piece manipulator 20 has two pinching structures 21, 22 that extend from a housing 26. The two pinching structures 21, 22 are pressable together and configured to grab and hold the game pieces 30.

Each of the pinching structures 21, 22 of the game piece manipulator 20 have an electrically conductive portion 23, 24 located on the surface. The electrically conductive portions 23, 24 are located where a user will contact the game piece manipulator 20 as the user manipulates the game pieces 30 with the game piece manipulator 20, for example, as shown and described herein with reference to FIG. 11. For example, when held by a user, the electrically conductive portions 23, 24 may contact the user's skin. The housing 26 contains electrical components of the game piece manipulator 20 that are configured to receive power from the base 10, such as through connector 25, as well as control signals, shock charges, and the like from the controller 200 required to emit an electric stimulus by the electrically conductive portions 23, 24.

In this embodiment, the base 10 includes a plurality of switches 12, 13, 14 which may control the ON or OFF status of the base 10 (such as switch 12), modes of game play (such as switch 14), and the intensity of the electric stimulus emitted by the electrically conductive portions 23, 24 of the game piece manipulator 20 (such as switch 13. Other aspects for which a switch on the base 10 may be provided include for example, volume, a timer, and the like. The base 10 is not limited to including switches 12, 13, 14 for the control of the base 10 and aspects of game play. For example, the base 10 may include one or more buttons, a touch screen, one or more dials, and the like. In another embodiment, the ON or OFF status of the base 10, and the aspects of game play such as game play mode and electric stimulus intensity may be controlled by a mobile application on a user's mobile device such as a smartphone, tablet, computer, and the like, which is configured to pair with and control the settings of the base 10 such as by sending signals to the controller 200. The base 10 also has a start button 500 in this embodiment, which begins the game 1 when pressed by a user.

Figure 2:
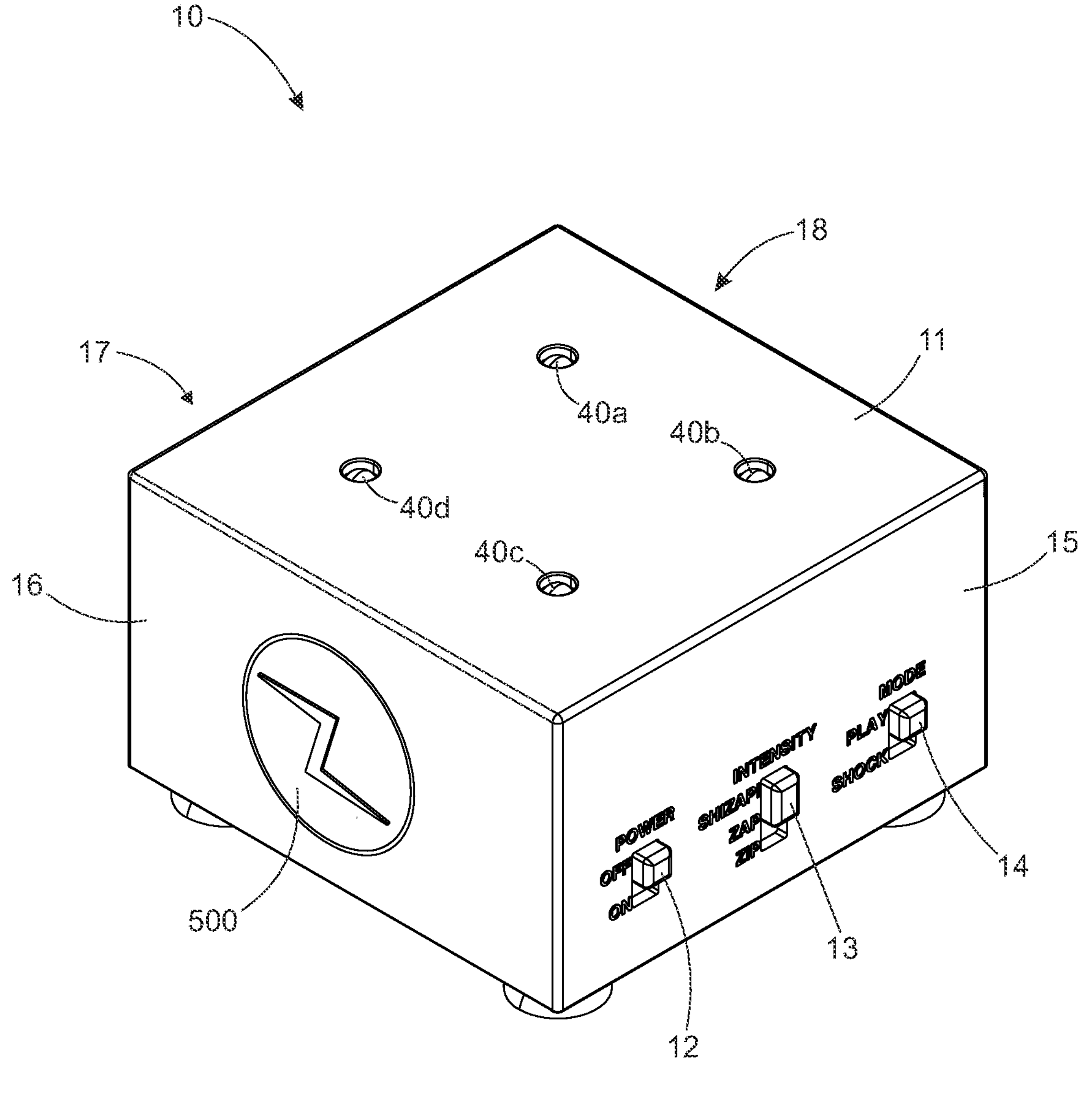
FIG. 2 depicts a perspective view of an electrified game piece manipulation game base according to an embodiment.

Referring now to FIG. 2, a perspective view of the base 10 is shown according to an embodiment. The base 10 has a bottom 55 (shown and described with reference to FIG. 4). The base 10 further has four sides 15, 16, 17, 18. The top flat base surface 11 is square in shape and the edges of the top flat base surface 11 abut the edges of the sides 15, 16, 17, 18 of the base 10. In another embodiment, the base 10 may have a different number of sides. The base 10 is not limited to having a top flat base surface 11 having the same number of sides as the base 10. One or more of the sides 15, 16, 17, 18, flat top base surface 11, and bottom 55 may be made out of plastic, metal, wood, or other rigid material. One or more of the sides 15, 16, 17, 18, flat top base surface 11, and bottom 55 may each be made out of the same material, or may be made out of different materials.

Figure 12:
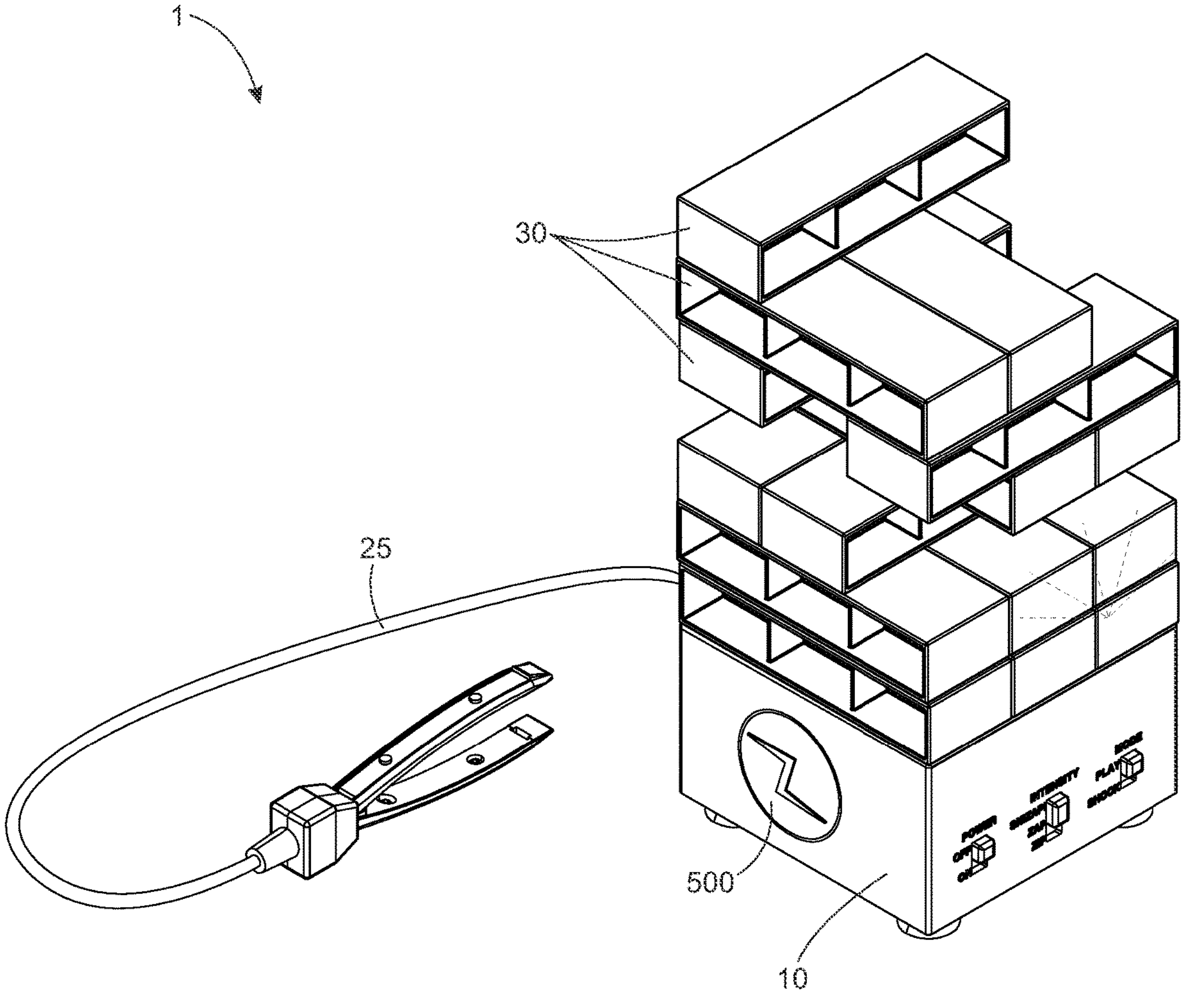
FIG. 12 depicts a perspective view of an electrified game piece manipulation game having an illuminating base according to an embodiment.
Figure 13:
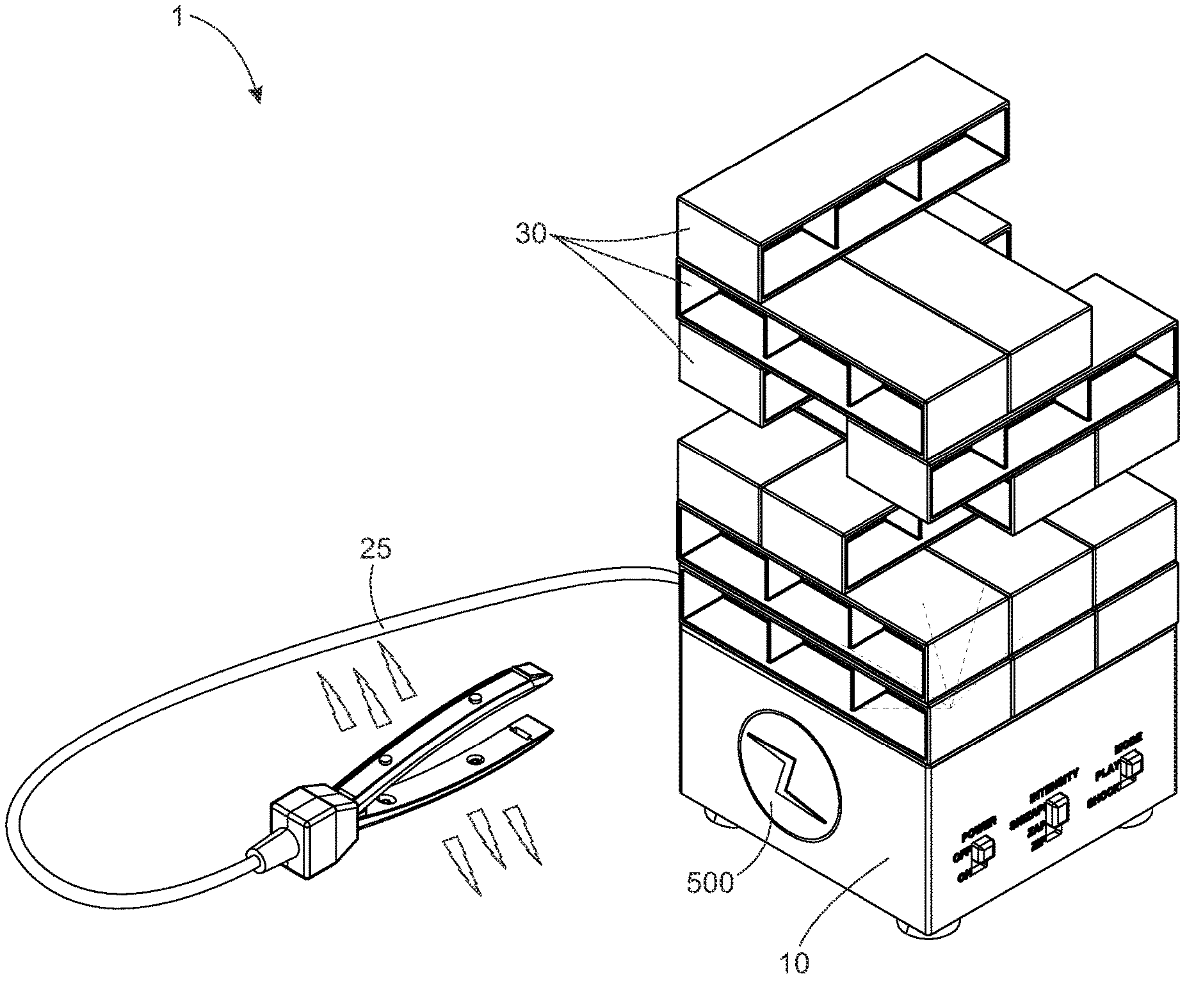
FIG. 13 depicts a perspective view of an electrified game piece manipulation game having an illuminating base according to another embodiment.

With continuing reference to FIG. 2, the base 10 includes a plurality of lights 40*a*, 40*b*, 40*c*, 40*d*. The lights 40*a*, 40*b*, 40*c*, 40*d* may be LEDs, incandescent bulbs, and the like. In this embodiment, the lights 40*a*, 40*b*, 40*c*, 40*d* are recessed in the top of the base 10 such that the flat top base surface 11 maintains a smooth flat plane on which the game pieces 30 can be interchangeably arranged. The lights 40*a*, 40*b*, 40*c*, 40*d* may be configured to produce different colored lights, for example, red, green, and white lights. The illumination of the lights 40*a*, 40*b*, 40*c*, 40*d* such as shown and described hereinafter with reference to FIGS. 12 and 13, is controlled by the controller 200. In another embodiment, the top flat base surface 11 may not have any recessed areas, for example, the lights 40*a*, 40*b*, 40*c*, 40*d* may be arranged under the top flat base surface 11, which may be transparent such that the light emitted by the lights 40*a*, 40*b*, 40*c*, 40*d* can shine through the top flat base surface 11. The base 10 is not limited to having four lights and could have more than four lights or less than four lights.

Figure 3:
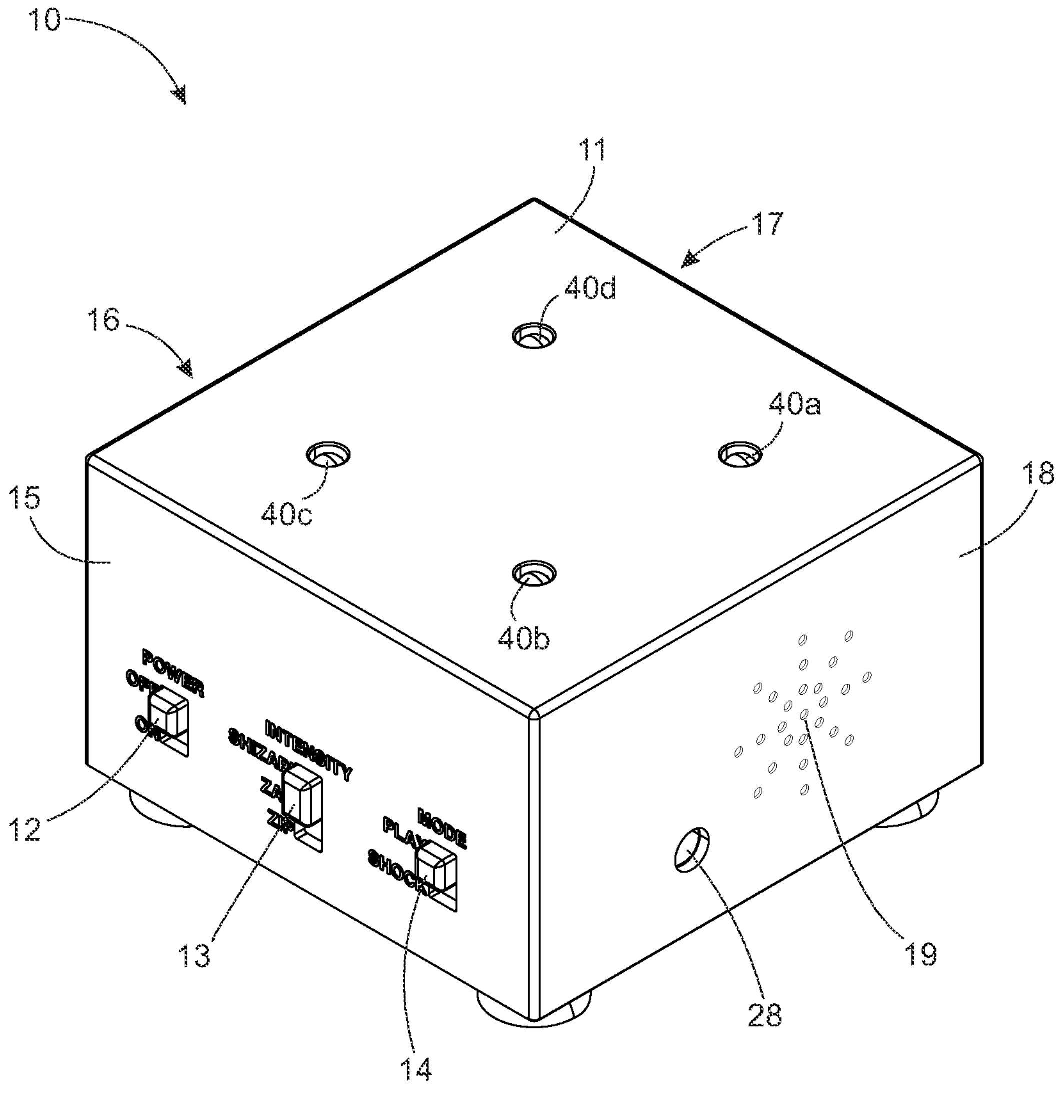
FIG. 3 depicts a perspective view of an electrified game piece manipulation game base according to another embodiment in which the base includes a speaker.

Referring now to FIG. 3, a perspective view of the base 10 is shown according to an embodiment. In this embodiment, the base 10 is configured to play audio, such as music, tones, recorded sounds or vocals, and the like. The audio may be stored in a memory within the base 10 and turned on and off by the controller 200. In this embodiment the base 10 includes one or more speakers 19 through which the audio can be played. With continuing reference to FIG. 3, the base 10 may further include a port 28, such as a female port in which a male end of the connector 25 of the game piece manipulator may be plugged into the base 10 such that power, control signals, and shock charges can be provided to the game piece manipulator 20, such as shown and described hereinafter with respect to FIG. 8, for example, using a capacitor located in the base 10. In embodiments in which the game piece manipulator 20 is wireless, the base 10 may not have a connection part 28. The base 10 may also include a buzzer that is controlled by the controller 200. Further, in embodiments in which the game piece manipulator 20 is wireless, a capacitor may be located within the game piece manipulator 20.

Figure 4:
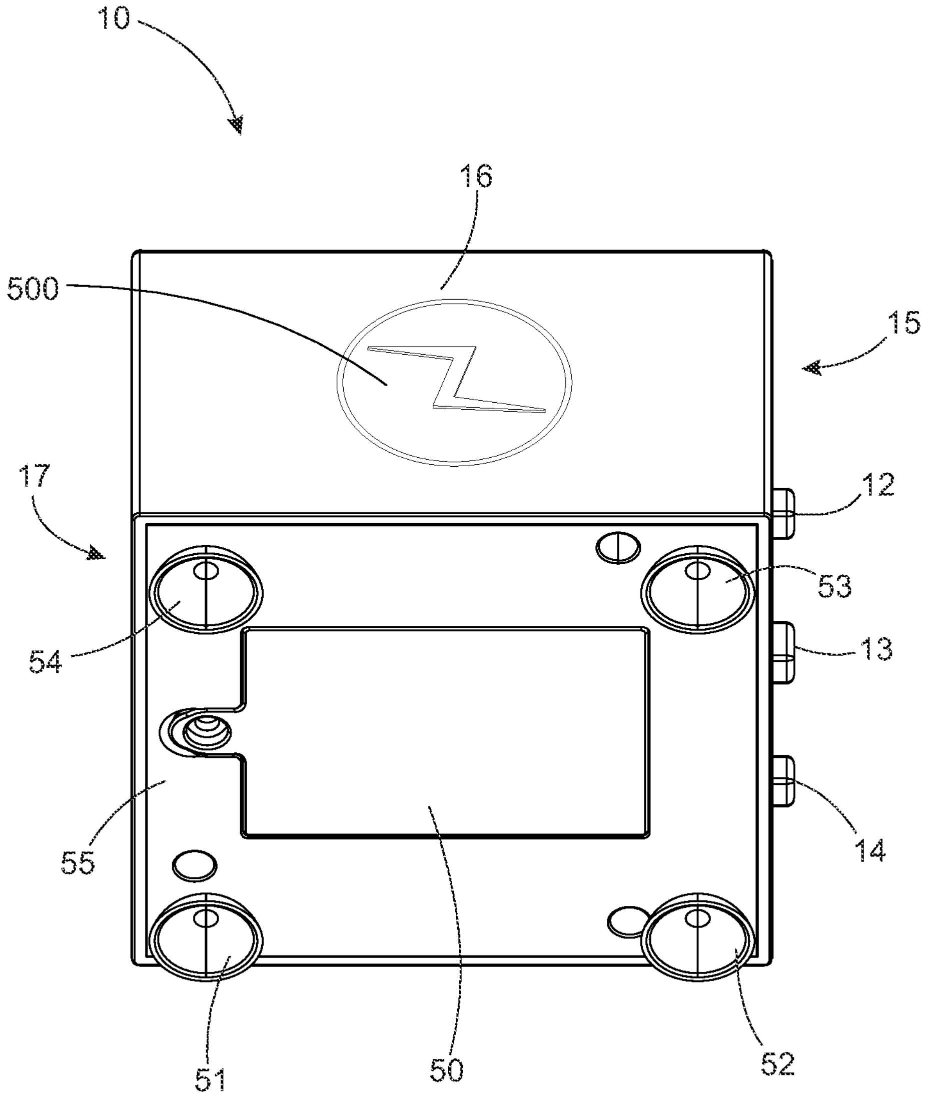
FIG. 4 depicts a bottom view of an electrified game piece manipulation game base according to an embodiment.

With reference to FIG. 4, a bottom perspective view of the base 10 is shown. In this embodiment, the bottom 55 of the base 10 may include a plurality of supports 51, 52, 53, 54 to support the base 10 when the base 10 is set up for game play, for example, on a table, counter, or floor. In an embodiment, the supports 51, 52, 53, 54 may be suction cups. In another embodiment, the supports 51, 52, 53, 54 may be nubs, legs, feet, ridges, slats, and the like. The supports 51, 52, 53, and 54 may be made of rubber, silicon, plastic, wood, and the like. An embodiment in which the supports 51, 52, 53, 54 are suction cups is advantageous in keeping the base 10 secured to the surface on which the base 10 is placed, as movements of the players during game play may tend to cause the base 10 to be moved, such as by players' movement of the game piece manipulator 20 in embodiments in which the game piece manipulator 20 is connected to the base 10 by a connector 25.

With continuing reference to FIG. 4, the bottom 55 of the base 10 may further include a battery compartment 50 configured to receive batteries, such as alkaline batteries, for example, AA batteries, AAA batteries, C batteries, and the like. The base 10, including the controller 200, lights 40*a*, 40*b*, 40*c*, and 40*d*, and other internal electronic components may be powered by batteries. In an embodiment, the base 10 includes a rechargeable battery and a port by which the rechargeable battery can be plugged into a power source to recharge, such as by a USB, for example, a Type-C USB, Type-A USB, Type-B Mini USB, Type-B Micro USB and the like.

Figure 5:
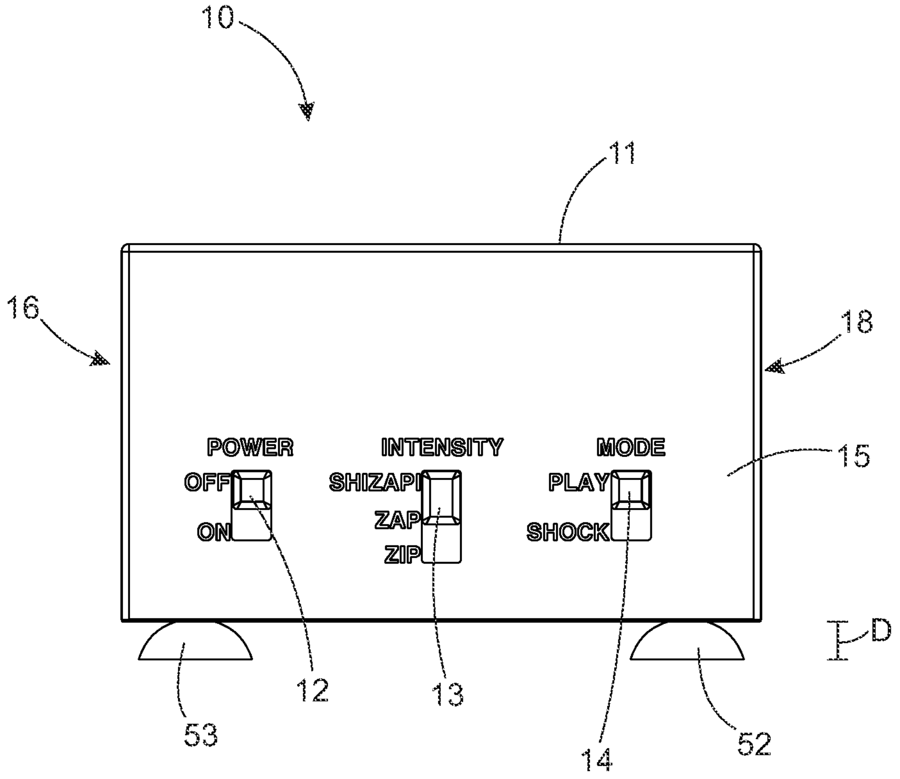
FIG. 5 depicts a side view of an electrified game piece manipulation game base according to an embodiment.

With reference to FIG. 5, a front view of the base 10 is shown. The supports 51, 52, 53, 54 may raise the base 10 a distance D above the surface upon which the base 10 is placed. This is advantageous for common game play settings in which the players may be enjoying food and beverages around the game 1. If a spill occurs, the base 10 where the electronic components of the game 1 are housed are thereby kept away from the spill.

Figure 6:
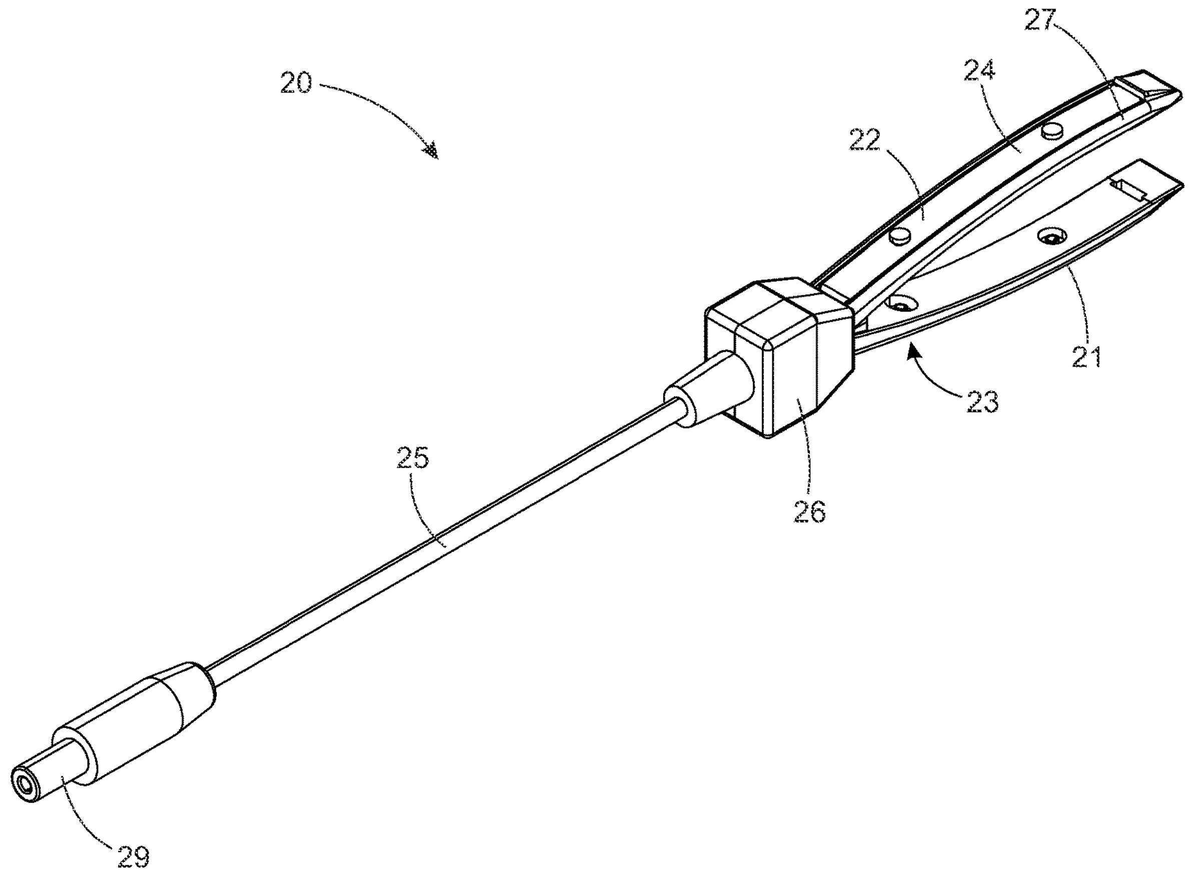
FIG. 6 depicts a perspective view of a game piece manipulator having a connector according to an embodiment.
Figure 8:
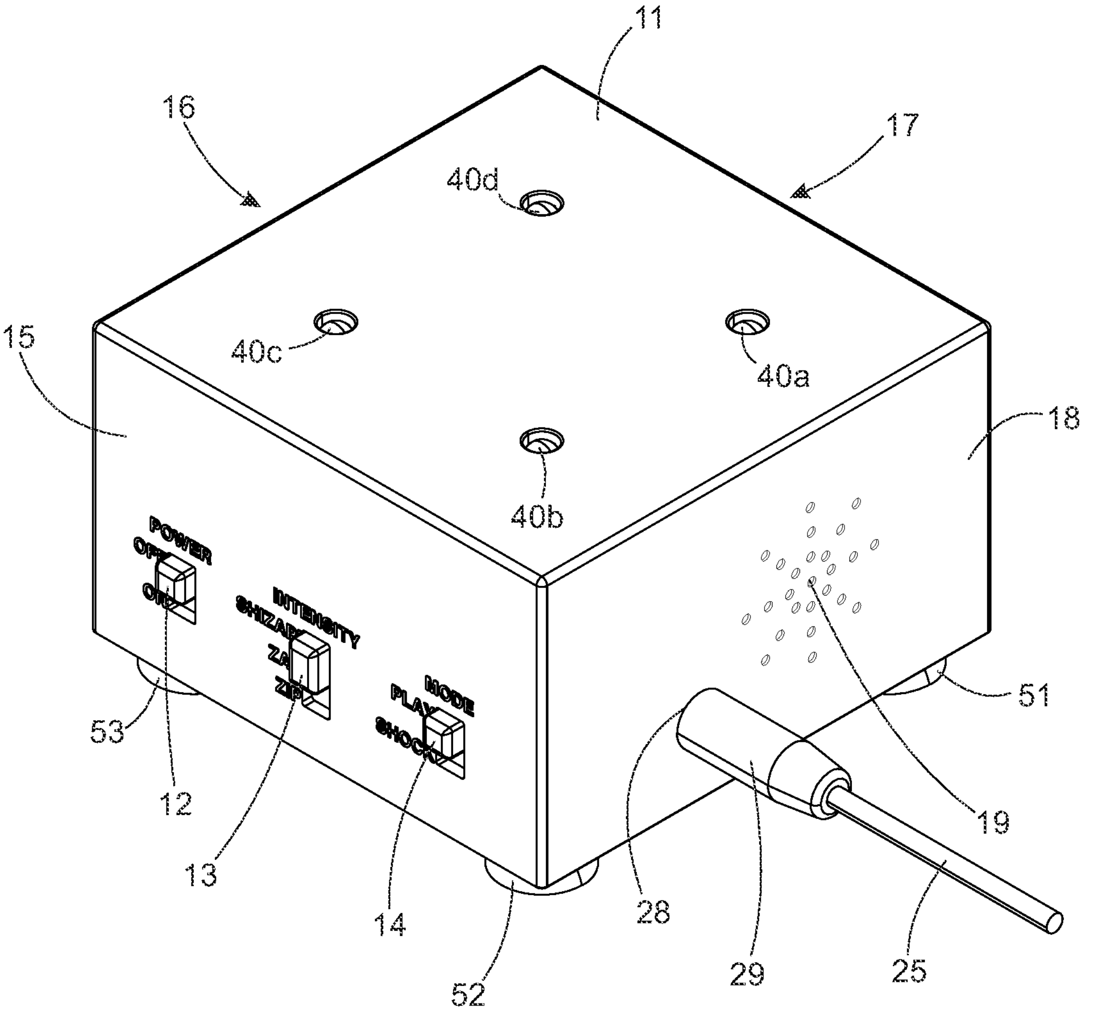
FIG. 8 depicts a perspective view of a connector of a game piece manipulator connected to an electrified game piece manipulation game base according to an embodiment.

With reference to FIG. 6, a perspective view of a game piece manipulator 20 is shown according to an embodiment. In this embodiment, the game piece manipulator 20 includes a connector 25 having a male connector part 29 configured to plug into the port 28 of the base 10, as shown with reference to FIG. 8. Referring briefly to FIG. 8, a perspective view of the base 10 having the connector 25 of the game piece manipulator 20 plugged into the port 28 is shown. Returning to FIG. 6, the electrically conductive portions 23, 24 may be connected to the surface 27 of the game piece manipulator 20 by rivets, screws, adhesive, and the like. In another embodiment, the pinching structures 21, 22 may be metal coated plastic, the metal being electrically conductive. The housing 26 of the game piece manipulator may contain the electric components such as wiring and solder connections connecting the electrically conductive portions 23, 24 to the base 10, and providing power and shock charges to the game piece manipulator 20 from the base 10.

Figure 7:
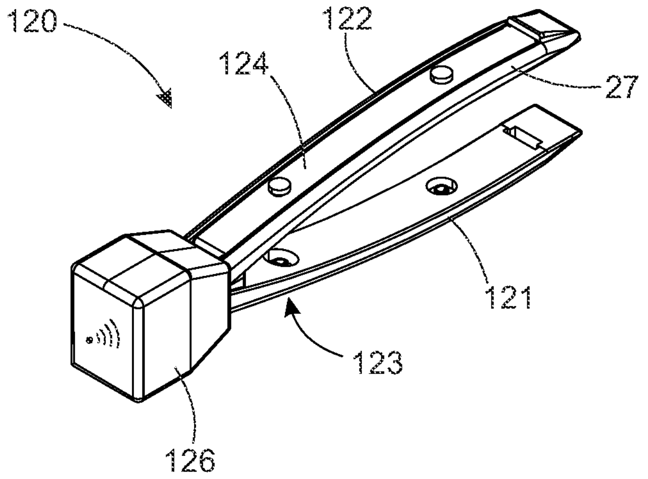
FIG. 7 depicts perspective view of a game piece manipulator according to another embodiment.

Referring now to FIG. 7, a perspective view of a game piece manipulator 120 according to another embodiment is shown. In this embodiment, the game piece manipulator 120 wirelessly connects to the base 10 and receives control signals from the controller 200 without needing to be connected such as by connector 25, to the base 10. A wireless connection between the game piece manipulator 20 may be by Wi-Fi, Bluetooth®, RF signals, and the like. The game piece manipulator 120 may further include a housing 126 containing the electrical components and wireless components necessary to make the wireless connection between the game piece manipulator 120 and the base 10, as well as power the game piece manipulator 120 such that the game piece manipulator 120 can emit an electric stimulus by the electrically conductive components 123, 124 upon receipt of a control signal from the controller 200. In this embodiment, the game piece manipulator 120 may be powered by one or more batteries which may be replaceable by opening the housing 126. In another embodiment, the game piece manipulator 120 may include a rechargeable battery and the housing 126 may include a port to receive a charger such as a USB charging cable to charge the rechargeable battery therein.

Figure 9:
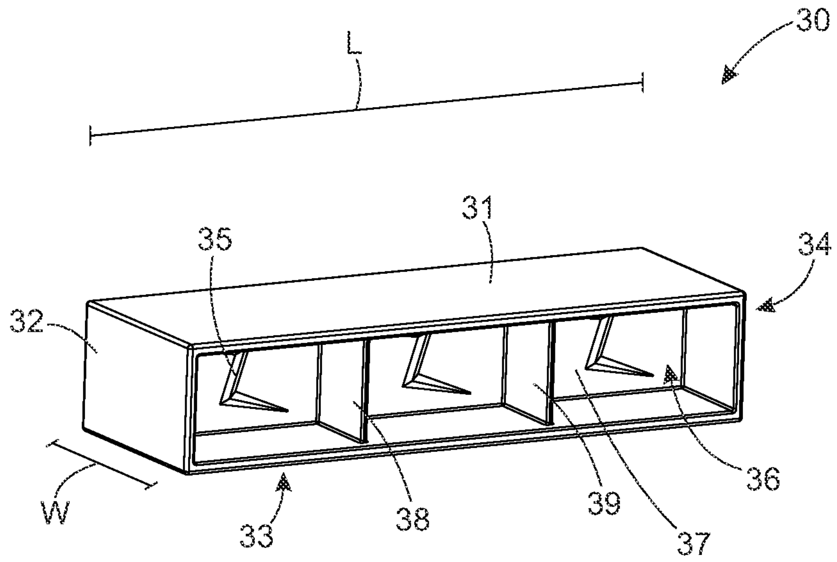
FIG. 9 depicts a perspective view of a game piece according to an embodiment.

With reference to FIG. 9, a perspective view of a game piece 30 is shown according to an embodiment. In this embodiment, each game piece 30 of the plurality of game pieces 30 may be the same shape, such as having a rectangular cross section like the game piece 30 shown in FIG. 9. In other embodiments, the game pieces 30 may have a differently shaped cross-section such as a hexagon, square, and the like. In this embodiment, the game piece 30 has a space 36 defined by a first side 31, second side 32, third side 33, and fourth side 34. The space 36 includes an internal center wall 37 that extends along the internal length L of the game piece, and a plurality of supplemental internal walls 38, 39 that extend along the internal width W of the game piece 30 and intersect with the internal center wall 37. The game piece 30 can be held and manipulated by the game piece manipulator 20, 120 by gripping the first side 31, second side 32, third side 33, and fourth side 34, and supplemental internal walls 38, 39 with the pinching structures 21, 22, 121, 122 of the game piece manipulator 20, 120. In this embodiment, the game piece 30 includes a game logo 35 on the internal center wall 37. In another embodiment, the internal center wall 37 may be blank. The internal center wall 37 and supplemental internal walls 38 may also be referred to as "ribs." In yet another embodiment, the game pieces 30 may be shaped like every-day objects such as foods, animals, buildings, body parts, household objects, vehicles, and the like. In such an embodiment, the game pieces 30 may include ribs that follow an outline of the shape of the game pieces, one or more ribs extending along a surface of the game pieces, and the like.

Figure 10:
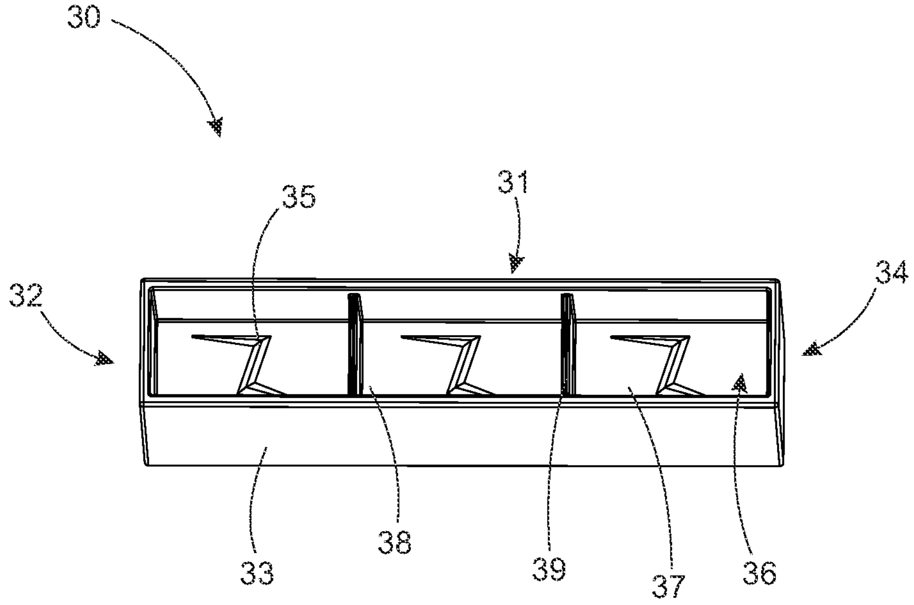
FIG. 10 depicts another perspective view of a game piece according to an embodiment.

With reference to FIG. 10, another perspective view of the game piece 30 is shown according to an embodiment. The game piece 30 is not limited to having a center internal wall 37 and supplemental internal walls 38, 39 as shown, and may have one or more walls or ribs extending the internal length L of the space 36, and one or more supplemental internals walls 38, 39 extending along the width W of the space 36. The supplemental internal walls 38, 39 may not be equidistant apart from one another and the second side 32 and fourth side 34. In an embodiment, the game piece 30 may only include a single supplemental internal wall such as supplemental internal wall 38 or 39. In an embodiment, each game piece of the plurality of game pieces 30 may be transparent, or partially transparent. For example, the plurality of game pieces 30 may be made of a clear or colored transparent plastic, acrylic, or like material. In one embodiment, the plurality of game pieces may be made of plastic, acrylic, or other material that is configured to fluoresce when exposed to a black light.

Figure 11:
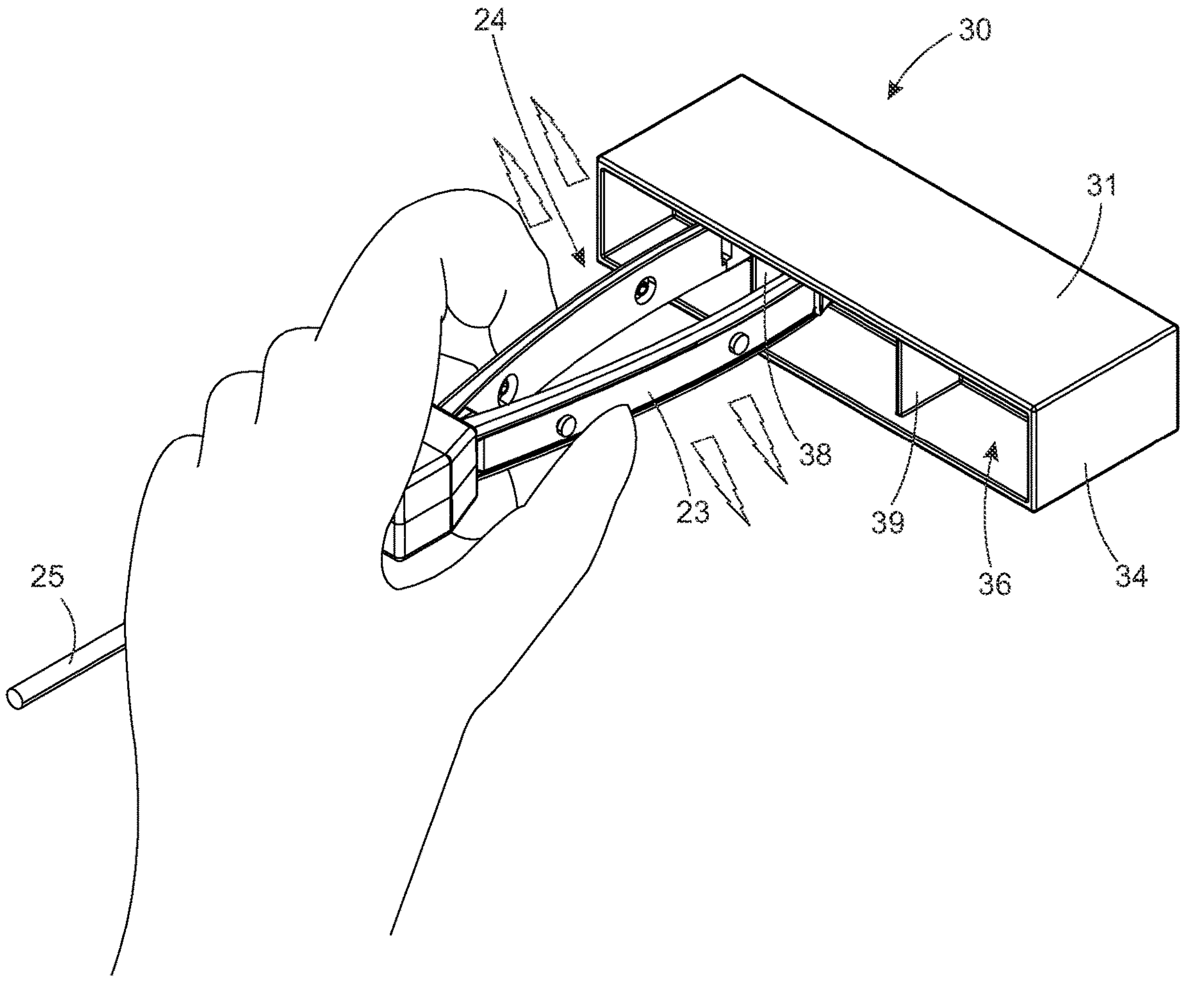
FIG. 11 depicts a perspective view of a player using a game piece manipulator to hold a game piece while the game piece manipulator emits an electric stimulus according to an embodiment.

Referring now to FIGS. 11-13, several aspects of game play of the electrified game piece manipulation game 1 are shown according to embodiments. In one embodiment, to play the game 1, one or more users may stack the plurality of game pieces 30 on the top flat base surface 11. The game pieces may be stacked in rows in which in each row, the game pieces 30 are arranged perpendicular to the row of game pieces 30 directly below. In another embodiment, to play the game, one or more users may take turns attempting to retrieve a game piece from one or more recesses in the flat top base surface 11. A step of game play may include a first player pushing a "start" or "on/off" button such as start button 500, or flipping an "on/off" switch such as switch 12, on the base 10, thereby beginning the game. Upon "starting," such as by pressing the start button 500, one or more of the lights 40*a*, 40*b*, 40*c*, 40*d* lights of the base 10 may emit light, such as green light or other colored light. Players may also select an electric stimulus intensity and game play mode such as by switches 13 and 14 on the base 10. In one embodiment of a game play mode, the controller 200 may control the game piece manipulator 20, 120 to emit an electric stimulus at randomly or timed intervals while audio such as music is played by the base 10 through the speaker 19. In another embodiment of a game play mode, the game piece manipulator 20, 120 may emit an electric stimulus at random or timed intervals with no audio playing. For example, the controller 200 may be configured to execute a random number generator to determine a random number that controls when the electric stimulus is emitted. This increases the anticipation and excitement of the players during game play, as the players cannot easily predict when the electric stimulus will be emitted.

During game play, players may take turns using the game piece manipulator 20, 120 to hold and move a game piece of the plurality of game pieces from any row of the stack of game pieces 30 and place that game piece on top of the stack of game pieces 30, or in another embodiment for example, retrieve game pieces 30 from recesses in the flat top base surface 11. In yet another example, game play may include removing game pieces from a stack of game pieces 30 without placing the removed game pieces on top of the stack of game pieces 30. During a player's turn, the player may unexpectedly receive an electric stimulus, for example, a shock, from the game piece manipulator. The electric stimuli experienced by the players increases the difficulty of game play and requires a high level of skill to grab, hold, and place the game pieces, which increases the excitement of game play. Further, movements of a player subjected to an electric stimulus make it difficult to avoid knocking over the stack of game pieces 30 altogether. If a player knocks over the stack of game pieces during their turn, the player may be required to take a penalty, such as an electric stimulus from the game piece manipulator 20, 120. In one embodiment of a game play mode, a penalty may be a three-second long or other timed electric stimulus. In another embodiment, for example, in which the flat top base surface 11 is configured to receive the game pieces 30 in one or more recesses in the flat top base surface 11, the electric stimulus makes it difficult for players to avoid dropping a game piece 30 back into the recess or recesses during their turn. If a player does so, or lets go of a piece once during their turn before placing it in a designated area for example, the player may receive a penalty as described above. In another embodiment, sides 15, 16, 17, 18 of the base 10 may be configured to receive game pieces 30, such as in recesses in the sides 15, 16, 17, 18.

Referring now specifically to FIG. 11, a perspective view of a player 300 using a game piece manipulator 20 to hold a game piece 30 while the game piece manipulator is emitting an electric stimulus. The game piece manipulator is holding the game piece by a supplemental internal wall 38 of the game piece 30. With reference to FIG. 12, a perspective view of the electrified block stacking game 1 in which the base 10 is illuminated is shown. In embodiments, during game play when no electric stimulus is being emitted by the game piece manipulator, certain of the lights 40*a*, 40*b*, 40*c*, 40*d* may be illuminated with a particular color of light, such as green light, or may be illuminated with black light. The light may be configured to shine through and illuminate the game pieces 30. With reference to FIG. 13, when the game piece manipulator 20, 120 is emitting an electric stimulus, different of the lights 40*a*, 40*b*, 40*c*, 40*d* may be illuminated, such as with a different color, such as red light. In an embodiment, a buzzer of the base 10 may go off when the game piece manipulator 20, 120 is emitting an electric stimulus. In an embodiment in which the flat top base surface 11 is configured to receive the plurality of game pieces 30 into recesses of the flat top base surface 11, each of the recesses may include one or more lights, such as LEDs that are controlled by the controller 200.

Figure 14A:
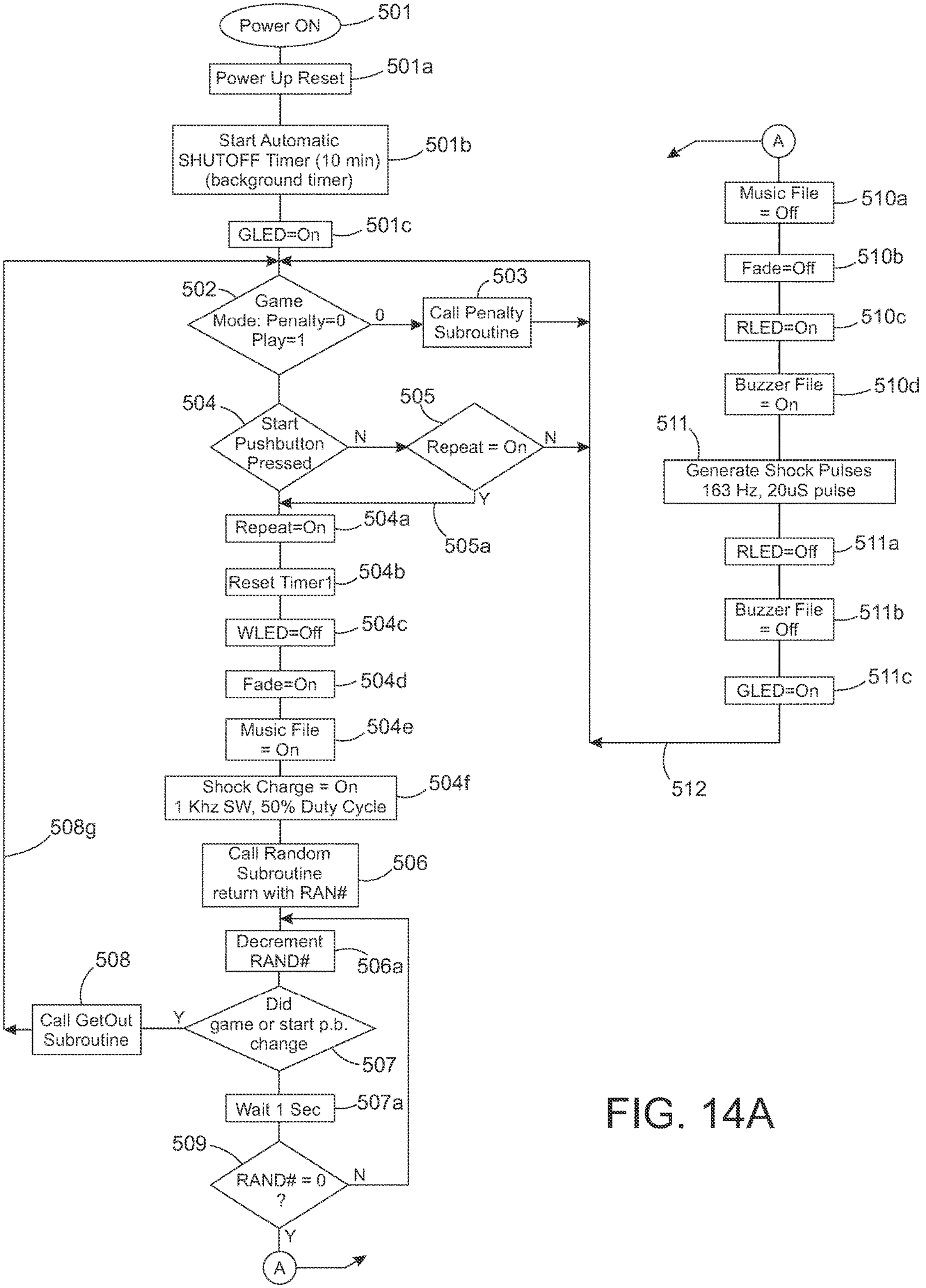
FIG. 14A depicts a flow chart of a method of game play of an electrified game piece manipulation game according to an embodiment.

With reference to FIG. 14A, a flow chart of a method of game play of an electrified game piece manipulation game 1 according to an embodiment. In a first step 501, after the base 10 is powered on, such as by switch 12. In a second step, once the base 10 is powered on, a power-up routine of the base 10 may be reset, as shown in block 501*a*, an automatic shut-off timer may be started as shown in block 501*b*, and a particular light, such as one or more of lights 40*a*, 40*b*, 40*c*, and 40*d* may be turned on, as shown in block 501*c*. In another step 502, the controller 200 may determine which game play mode is currently selected by the user, for example, with switch 14. When a game mode in which the user receives a penalty is selected, the controller 200 may call a subroutine in another step 503. When a game mode is selected in which music plays, another subroutine may be run, for example, starting with step 504. In step 504, the controller 200 may determine whether a "start" button such as start button 500 has been pressed. When the controller determines that "start" has not been selected, the controller 200 may then determine whether a repeat function is on in step 505. When a repeat function is not on, the controller 200 may return to step 502. When a repeat function is on, the controller 200 may proceed to repeat a previously selected game mode as shown by arrow 505*a*. When the controller 200 determines that "start" has been selected, as in step 504, the controller 200 may turn on a repeat function as shown in block 504*a*, reset a timer as shown in block 504*b*, turn off a particular light or lights that were turned on in block 501*c*, such as lights 40*a*, 40*b*, 40*c*, 40*d*, as shown in block 504*c*, turn on a fading function of a particular light or lights as shown in block 504*d*, turn on an audio file such as a music file, as shown in block 505*e*, and turn on a shock charge of the game piece manipulator 20, 120 as shown in block 504*f*. In an embodiment, the shock charge is always on when an audio file, such as music, is playing, and the shock charge is off when an audio file is not playing.

With continuing reference to FIG. 14A, in another step 506, the controller 200 may call a random number generator subroutine, which may include generating a random number for timing the occurrence of an electric stimulus by the game piece manipulator such as game piece manipulator 20, 120, and scaling the random number to a random number such as 5-50. In another step 506*a*, the controller 200 may decrement the random number. Another step 507 may include the controller 200 determining whether the game mode has changed, such as by the user pressing a button or changing a switch such as switch 14. When the controller 200 determines in step 506 that the game mode has changed, the controller 200 may call a "get out" subroutine 508, shown and described hereinafter in FIG. 14C. When the controller 200 determines in step 506 that the game mode has not changed, the controller 200 may wait a period of time such as one second, as shown in block 507*a*. In another step 509, the controller 200 may determine if the random number is equal to zero. When the controller 200 determines that random number does not equal zero, the controller 200 may return to step 506*a* of decrement of the random number.

When the controller 200 determines that the random number equals zero, the controller 200 may turn the playing audio file such as a music file is turned off as shown in block 510*a*, turn the fade of the fading lights off as shown in block 510*b*, turn on one or more differently colored lights, for example, one or more red lights, as shown in block 510*c*, and turn on an audio file such as a buzzer, as shown in block 510*d*. In another step 511, the controller 200 may send the game piece manipulator a control signal to generate electric stimulus, such as shock pulses, and the controller 200 may further next turn off the light or lights turned on in block 510*d*, as shown in block 511*a*, turn off the audio file such as buzzer as shown in block 511*b*, and turn a light or lights, such as from block 501*c* on as shown in block 511*c*. In another step, as shown by arrow 512, the controller 200 may return to step 502.

Figure 14B:
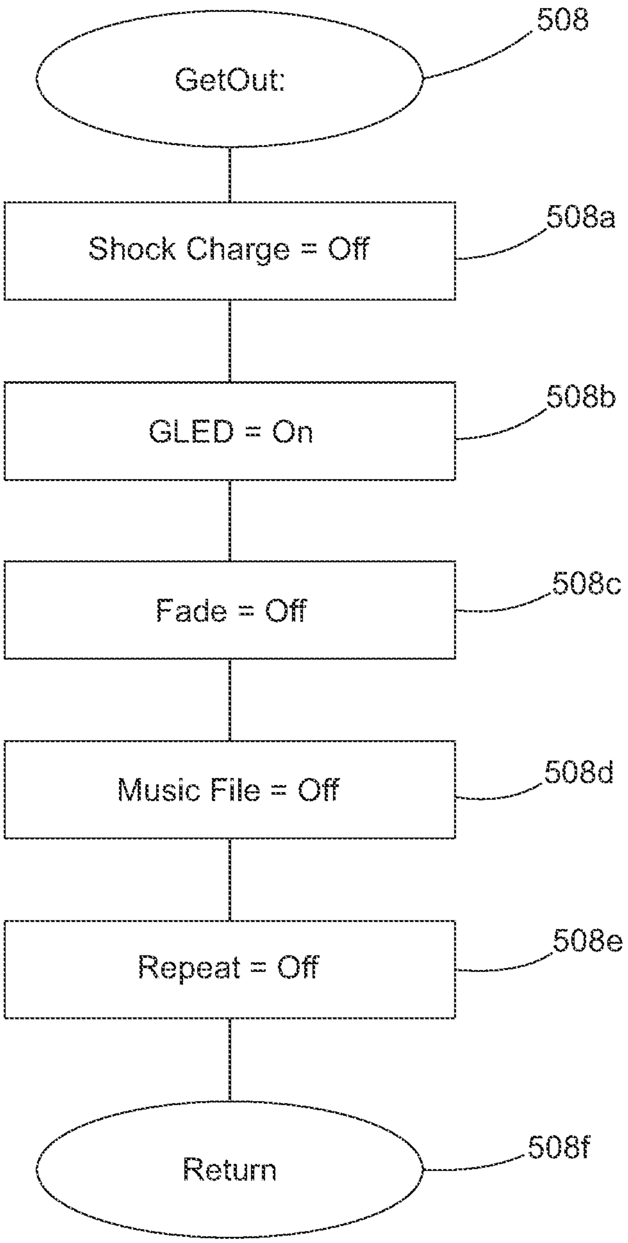
FIG. 14B depicts a flow chart of a method of a controller of an electrified game piece manipulation game according to an embodiment.

With reference to FIG. 14B, a flow chart of a method of game play of an electrified game piece manipulation game 1 according to an embodiment, particularly, step 508 of FIG. 14A. Step 508 may include several substeps performed by the controller 200, including turning the shock charge off, as shown in block 508*a*, turning on a light or lights as shown in block 508*b*, turning a fading function of a light or lights off, as shown in block 508*c*, turning a playing audio file such as a music file off as shown in block 508*d*, and turning a repeat function off as shown in block 508*e*. In a step 508*f*, the controller 200 may next return to step 502 as shown in FIG. 14A, with reference to arrow 508*g*.

Figure 14C:
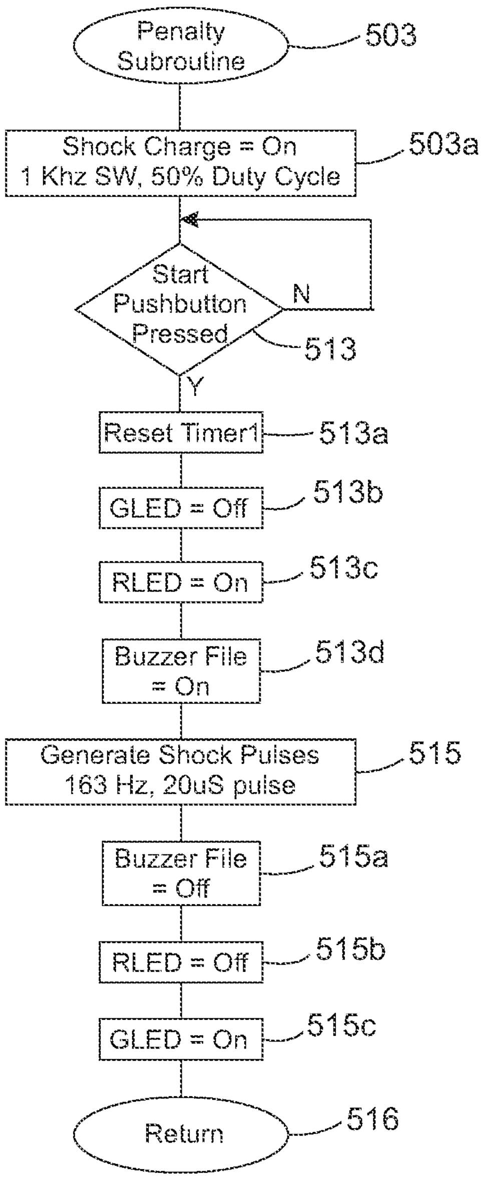
FIG. 14C depicts a flow chart of a method of a controller of an electrified game piece manipulation game according to an embodiment.

With reference to FIG. 14C, a flow chart of a method of game play of an electrified game piece manipulation game 1 according to an embodiment, in particular, step 503 shown in FIG. 14A. When the controller 200 calls the subroutine for a game mode in which a penalty is administered to a player, the controller 200 may perform a step 503*a* of turning on a shock charge of the game piece manipulator 20, 120. In an embodiment, during a penalty game mode, the shock charge remains on during game play. The controller may perform a further step 513 to determine whether a player has pressed a "start" button or switch, such as start button 500. When the controller 200 determines that a "start" has not been selected, the controller 200 may return to step 513. When the controller 200 determines that the "start" has been selected, the controller 200 may reset a timer as shown in block 513*a*, turn off the light or lights that were previously turned on in step 501*c* as shown in block 513*b*, turn on a light or lights, such as differently colored lights, for example, a red light or red lights as shown in block 513*c*, and turn on an audio file such as a buzzer as shown in block 513*d*. In another step 515, the controller 200 may send the game piece manipulator a control signal to generate electric stimulus, such as shock pulses, and the controller 200 may turn the audio file such as the buzzer off, as shown in block 515*a*, turn the light or lights turned on in block 513*c* off, as shown in block 515*b*, and turn the light or lights turned off in block 513*b* on as shown in block 515*c*. In another step 516, the controller 200 may return to step 502, as shown in FIG. 14A with reference to arrow 512. The controller 200 is not limited to performing the steps shown and described in the embodiments of FIGS. 14A-14C, and is not limited to performing the steps shown and described in the embodiments of 14A-14C in the order shown in the Figures.

Figure 15:
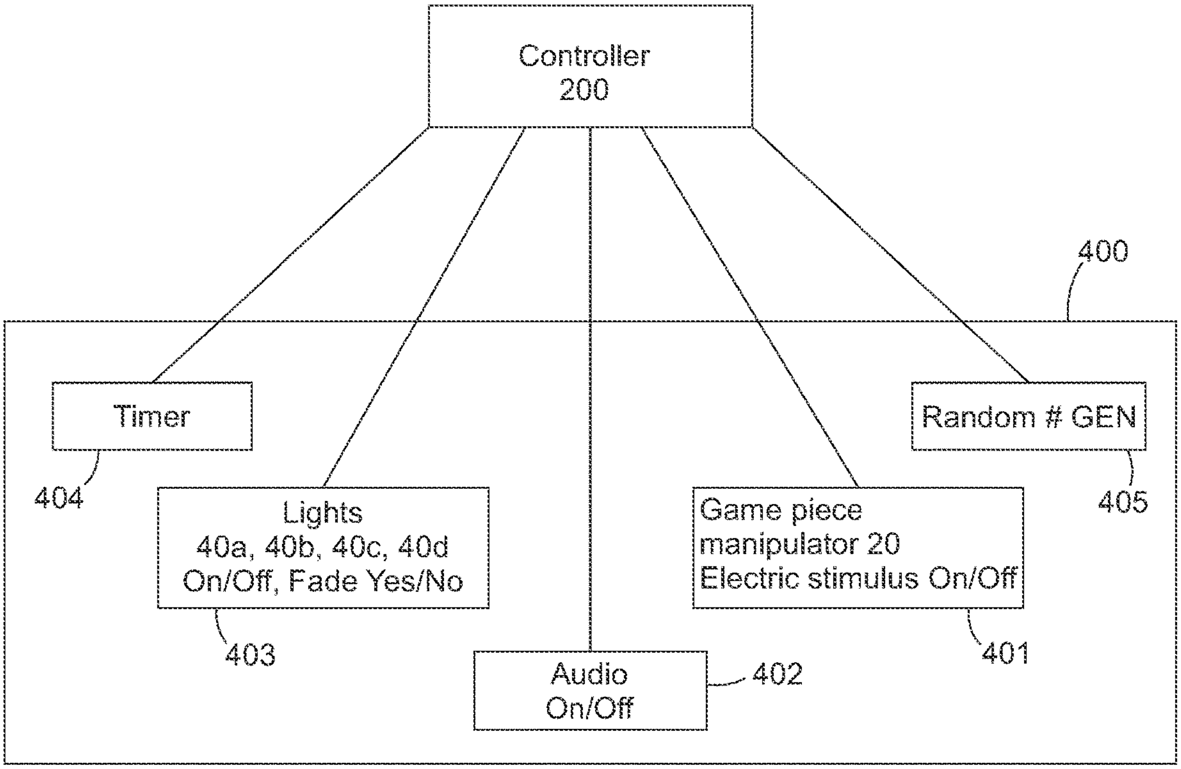
FIG. 15 depicts a schematic of a controller of an electrified game piece manipulation game according to an embodiment.

With reference to FIG. 15, a schematic of the controller 200 of the base 10 is shown according to an embodiment. During game play 400, one or more steps as shown in FIGS. 14A-14C may be performed by the controller 200 based on which game play mode is selected by a user. During game play 400, the electric stimuli emitted by the game piece manipulator 401, such as game piece manipulator 20, 120; the illumination of the lights 403, such as whether the lights are on or off, or fading or steady illumination, such as lights 40*a*, 40*b*, 40*c*, 40*d*; audio 402, such as music played through the speaker 19, a timer operation 404, and random number generator operation 405 are controlled by the controller 200.

Figure 16:
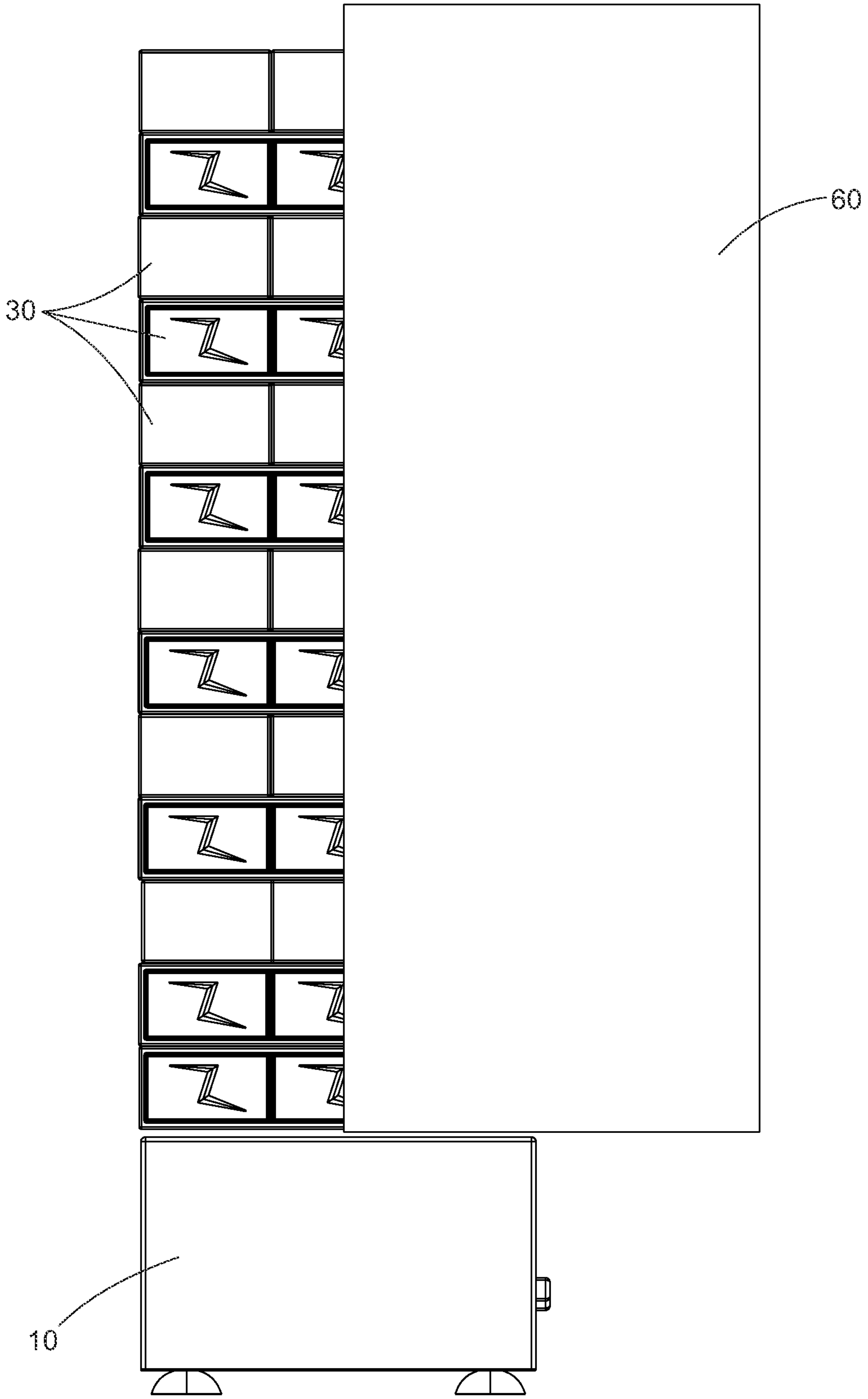
FIG. 16 depicts a side view of a game piece stacking guide structure according to an embodiment.
Figure 17:
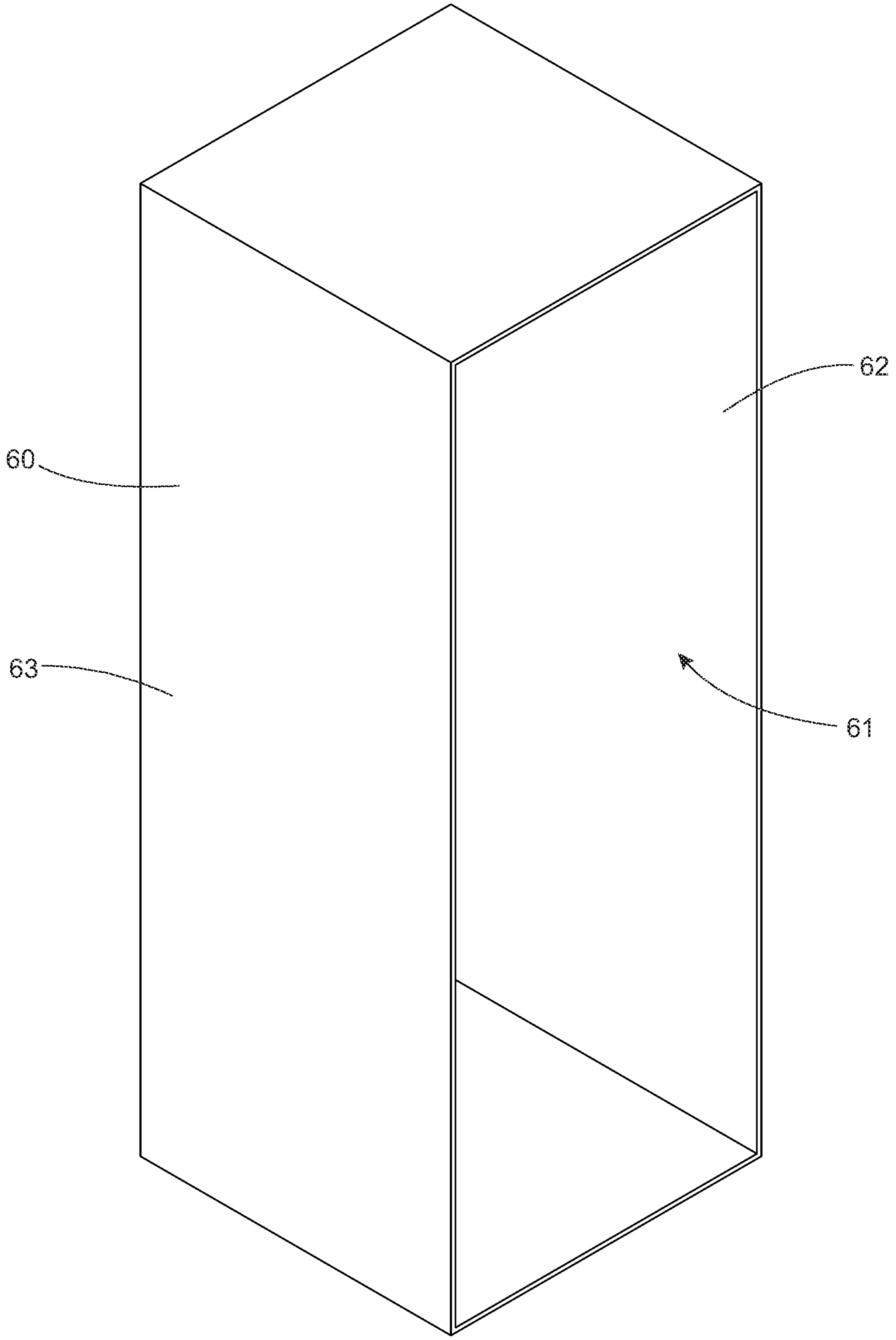
FIG. 17 depicts a perspective view of a game piece stacking guide structure according to an embodiment.

In some embodiments, the game pieces 30 may be interchangeably stacked on the top flat base surface 11 using a game piece stacking guide structure. With reference to FIG. 16, a game piece stacking guide structure 60 is shown according to an embodiment. The game piece stacking guide structure 60 can be used to align the stacked rows of game pieces 30 on the top flat base surface 11. Referring to FIG. 17, a perspective view of the game piece stacking guide structure 60 has a space 61 inside of which the game pieces 20 can be arranged with the sides 62, 63 aligning the sides of the stack of game pieces 30. Once the game pieces 30 are stacked and aligned within the game piece stacking guide structure 60, the game piece stacking guide structure 60 may be placed onto the top flat base surface 11 and then removed from the stack of game pieces as shown in FIG. 16.

In an embodiment, a game kit for an electrified game piece manipulation game such as electrified game piece manipulation game 1 may comprise a base, such as base 10 having a flat top base surface, such as flat top base surface 11, and a controller, such as controller 200; a game piece manipulator, such as game piece manipulator 20, 120, configured to hold a game piece, such as a game piece of the plurality of game pieces 30, the game piece manipulator including a surface, such as surface 27, having an electrically conductive portion, such as electrically conductive portion 23,24; and a plurality of game pieces, such as plurality of game pieces 30, configured to form an interchangeable stack on the flat top base surface 11. In this embodiment, the controller may be configured to send a control signal to the game piece manipulator to emit an electric stimulus, and the game piece manipulator may be configured to receive the control signal and emit an electric stimulus by the electrically conductive portion. In another embodiment, the game kit may further comprise a game piece stacking guide structure, such as game piece stacking guide structure 60, configured to receive a plurality of game pieces and align each game piece of the plurality of game pieces such that the plurality of game pieces forms a stack placeable on the top surface. In another embodiment, the electrically conductive portion may be positioned such a user, such as user 300, contacts the electrically conductive portion when the user holds the game piece manipulator.

Figure 18:
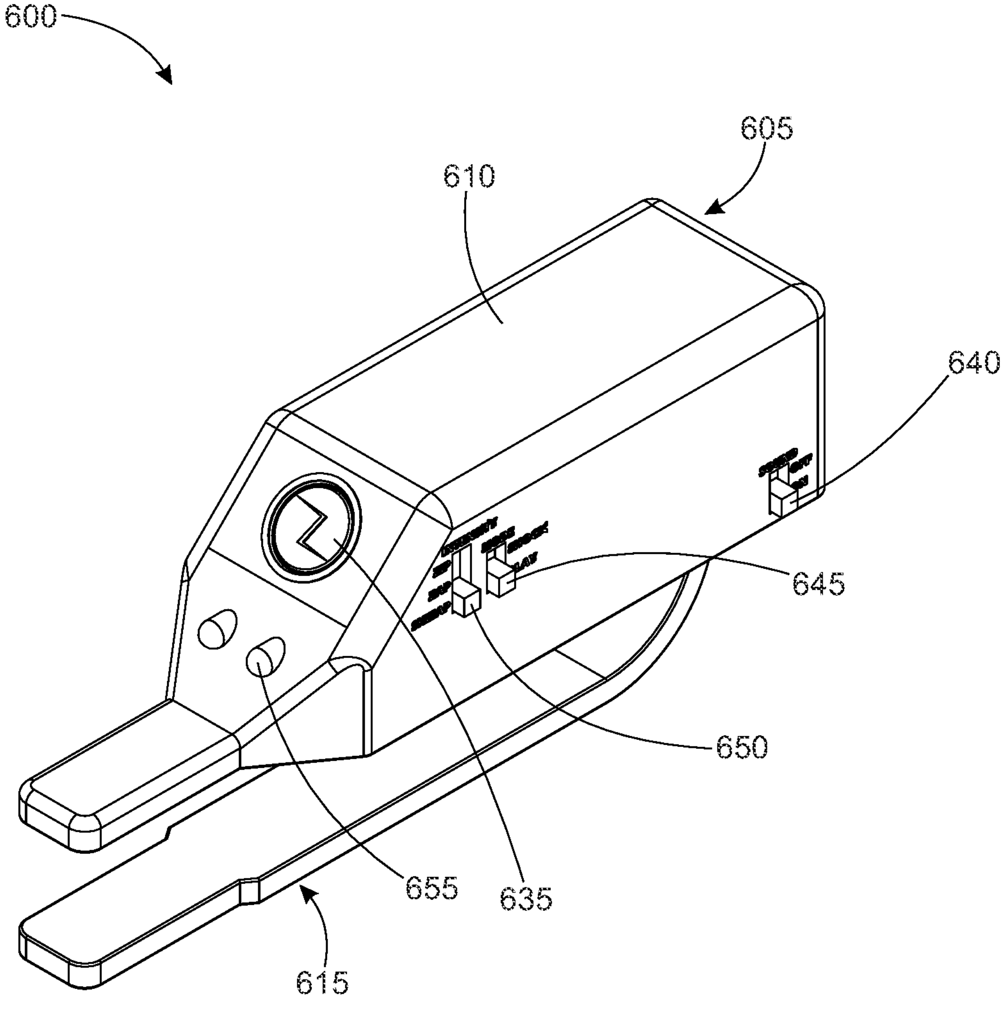
FIG. 18 is a perspective view of game piece manipulator in accordance with an embodiment of the subject technology.
Figure 19:
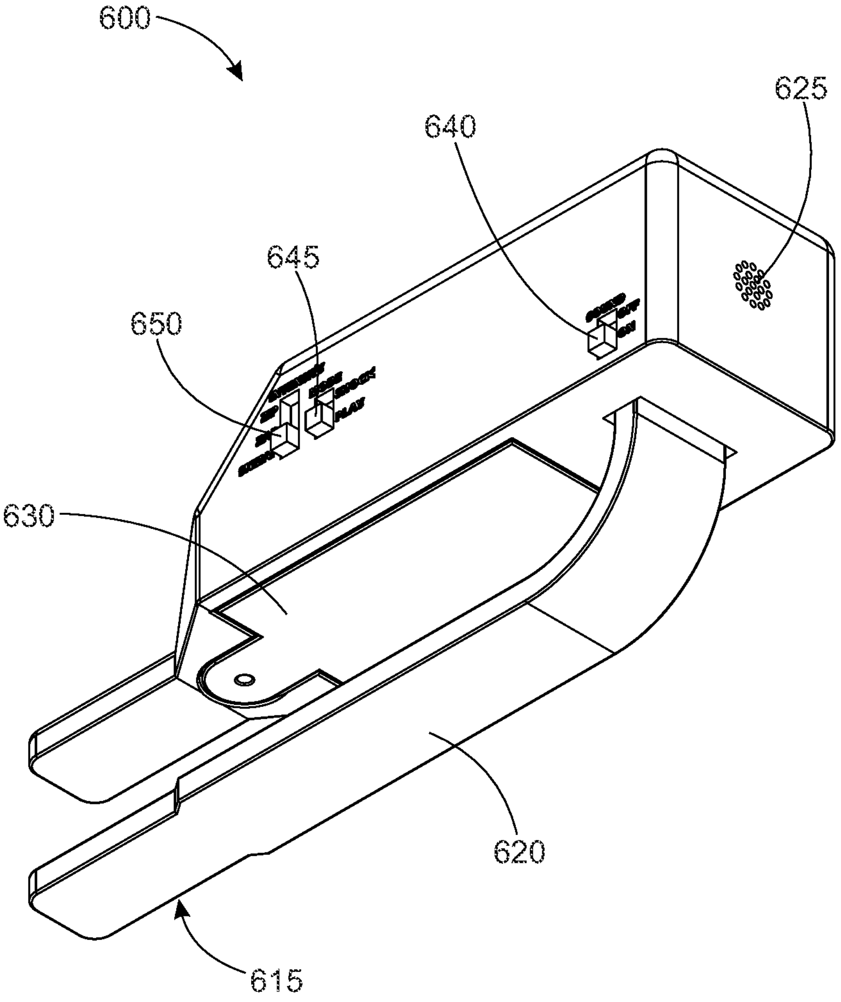
FIG. 19 is a perspective view of a game piece manipulator in accordance with an embodiment of the subject technology.

Modifications may be made to the game piece manipulator 20, 120 without departing from the scope of the subject invention. For example, all the components of the base 10, including the controller 200, electrical components, wireless components, and other components may be integrated within the game piece manipulator 20, 120 to form a game piece manipulator 600, such as shown in FIGS. 18 and 19. Accordingly, in this embodiment, the game system may comprise a single unit.

The game piece manipulator 600 may comprise a first surface 605 comprising a first electrically conductive portion 610 and a second surface 615 comprising a second electrically conductive portion 620. The first electrically conductive portion 610 and the second electrically conductive portion 620 may be positioned on the first surface 605 and the second surface 615, respectively, to be in contact with a user of the game system when the user holds the game piece manipulator 600. Accordingly, the game piece manipulator 600 may be functionally equivalent to the game piece manipulator 20, 120 described throughout the present application.

The game piece manipulator 600 may also comprise a speaker 625 for playing audio. The speaker 625 may be controllably operated by the controller 200. In addition, the game piece manipulator 600 may comprise a power supply 630 for supplying power to various components of the game piece manipulator 600. The game piece manipulator 600 may further comprise a "start" or "ON/OFF" button 635 for controlling the supply of power from the power supply 630 to various components of the game piece manipulator 600, an audio switch 640 for turning the speaker 625 ON and OFF, a mode switch 645, a stimulus intensity switch 650, and a plurality of differently colored LEDs 655. The "start" or "ON/OFF" button 635 may be functionally equivalent to the switch 12, and the mode switch 625 may be functionally equivalent to the switch 14. Similarly, the stimulus intensity switch 630 may be functionally equivalent to the switch 13, and the plurality of differently colored LEDs 655 may be functionally equivalent to the lights 40*a*, 40*b*, 40*c*, and 40*d*. It will be appreciated that the base 10 may comprise a switch that is functionally equivalent to the audio switch 640 for turning the speaker 19 ON and OFF.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A game system, comprising:

a game piece; and a game piece manipulator configured to hold the game piece and comprising:

a first surface comprising a first electrically conductive portion;

a controller configured to control an electric stimulus emitted by the game piece manipulator, wherein the game piece manipulator emits the electric stimulus by the first electrically conductive portion; and a power supply.

2. The game system of claim 1, wherein the game piece manipulator comprises tweezers.

3. The game system of claim 1, wherein the power supply and the controller are integrated within the game piece manipulator.

4. The game system of claim 1, wherein the first electrically conductive portion is positioned to be in contact with a user when the user holds the game piece manipulator.

5. The game system of claim 1, wherein the game piece manipulator further comprises a second surface comprising a second electrically conductive portion, wherein the first electrically conductive portion and the second electrically conductive are positioned on the first surface and the second surface, respectively, to be in contact with a user when the user holds the game piece manipulator.

6. The game system of claim 1, wherein the game piece manipulator further comprises a plurality of differently colored LEDs, and wherein the plurality of LEDs are controllably operated by the controller to change illumination according to whether the controller emits a control signal to the game piece manipulator to emit an electric stimulus.

7. The game system of claim 1, wherein the game piece manipulator is further configured to emit a plurality of different intensities of electric stimulus, and wherein the intensity of the electric stimulus is controllably operated by the controller.

8. The game system of claim 1, further comprising a plurality of game pieces configured to form an interchangeable stack on a surface.

9. The game system of claim 1, wherein the game piece manipulator further comprises a speaker configured to play audio, and wherein the speaker is controllably operated by the controller.

10. The game system of claim 9, wherein the game piece manipulator further comprises a switch configured to turn the speaker ON and OFF.

11. A game piece manipulator, comprising a controller, a power supply, and a tweezer having a surface, wherein the surface includes at least one electrically conductive portion positioned on the surface to be in contact with a user when the user holds the game piece manipulator, wherein the at least one electrically conductive portion is in communication with the controller and is configured to receive a control signal from the controller, and wherein the at least one electrically conductive portion emits an electric stimulus in response to receiving the control signal from the controller.

12. The game piece manipulator of claim 11, wherein the power supply and the controller are integrated within the game piece manipulator.

13. The game piece manipulator of claim 11, wherein the power supply comprises a rechargeable battery.

14. The game piece manipulator of claim 11, wherein the game piece manipulator comprises a speaker configured to play audio, and wherein the speaker is controllably operated by the controller.

15. The game piece manipulator of claim 14, wherein the game piece manipulator further comprises a switch configured to turn the speaker ON and OFF.

16. A game kit, comprising:

a plurality of game pieces;

a game piece manipulator configured to hold at least one of the plurality of game pieces and emit an electric stimulus, wherein the game piece manipulator comprises:

a first surface having a first electrically conductive portion;

a controller configured to control the electric stimulus, wherein the electric stimulus is emitted by the first electrically conductive portion; and a power supply.

17. The game system of claim 16, wherein the game piece manipulator comprises tweezers.

18. The game kit of claim 16, wherein the power supply and the controller are integrated within the game piece manipulator.

19. The game kit of claim 16, further comprising a game piece stacking guide structure configured to receive the plurality of game pieces and align each game piece to form a stack of the plurality of game pieces.

20. The game kit of claim 16, wherein the game piece manipulator further comprises a second surface comprising a second electrically conductive portion, wherein the first electrically conductive portion and the second electrically conductive are positioned on the first surface and the second surface, respectively, to be in contact with a user when the user holds the game piece manipulator.

* * * * *